United States Patent
Goldring et al.

(10) Patent No.: US 11,391,340 B2
(45) Date of Patent: Jul. 19, 2022

(54) NON-METALLIC ORIFICE PLATE WITH METALLIC WEAR INSERT

(71) Applicant: GOODRICH CORPORATION, Charlotte, NC (US)

(72) Inventors: Eric Goldring, Milton (CA); Rony Giovanni Ganis, Oakville (CA)

(73) Assignee: Goodrich Corporation, Charlotte, NC (US)

( * ) Notice: Subject to any disclaimer, the term of this patent is extended or adjusted under 35 U.S.C. 154(b) by 112 days.

(21) Appl. No.: 16/276,125

(22) Filed: Feb. 14, 2019

(65) Prior Publication Data

US 2020/0263758 A1     Aug. 20, 2020

(51) Int. Cl.
*F16F 15/023*      (2006.01)
*B64C 25/60*      (2006.01)

(52) U.S. Cl.
CPC .......... *F16F 15/0232* (2013.01); *B64C 25/60* (2013.01); *F16F 2224/025* (2013.01); *F16F 2226/04* (2013.01)

(58) Field of Classification Search
CPC ........ F16F 9/18; F16F 9/28; F16F 9/48; F16F 9/486; F16F 9/182; F16F 9/3485; F16F 9/006; F16F 7/09; F16F 15/0232; F16F 2226/04; F16F 2224/005; F16F 2224/025; F16F 2224/0291; F16F 9/342; B60R 22/28; B64F 2700/6242; B64C 25/60; B60G 15/12; F16B 41/002; F16B 43/001; H02G 13/80; B64D 45/02
USPC ... 188/289, 129, 381, 313, 288, 316, 322.19
See application file for complete search history.

(56) References Cited

U.S. PATENT DOCUMENTS

| | | | | |
|---|---|---|---|---|
| 2,883,181 A | * | 4/1959 | Hogan | F16F 5/00 188/289 |
| 3,291,475 A | * | 12/1966 | Stanislas | B60G 11/30 213/43 |
| 3,860,225 A | * | 1/1975 | Nakamura | F16F 9/486 188/289 |
| 4,426,109 A | * | 1/1984 | Fike, Jr. | B60R 19/32 188/289 |
| 4,452,437 A | * | 6/1984 | Lochner | C10M 107/34 188/289 |
| 5,178,243 A | * | 1/1993 | Hamada | F16F 9/364 188/315 |
| 5,806,985 A | * | 9/1998 | Emig | F16C 33/201 384/42 |
| 6,003,848 A | * | 12/1999 | Cotter | F16F 9/0218 267/64.11 |

(Continued)

FOREIGN PATENT DOCUMENTS

| | | |
|---|---|---|
| DE | 1865747 | 1/1963 |
| DE | 102006033801 | 1/2008 |
| ES | 2277538 | 7/2007 |

OTHER PUBLICATIONS

European Patent Office, European Search Report dated Jul. 13, 2020 in Application No. 19214862.5.

*Primary Examiner* — Robert A. Siconolfi
*Assistant Examiner* — San M Aung
(74) *Attorney, Agent, or Firm* — Snell & Wilmer L.L.P.

(57) ABSTRACT

An orifice plate may include a body portion comprised of a non-metallic material, and a metallic wear insert, wherein the metallic wear insert defines an inner diameter surface of the orifice plate and the body portion defines an outer diameter surface of the orifice plate.

18 Claims, 3 Drawing Sheets

(56) References Cited

U.S. PATENT DOCUMENTS

| | | |
|---|---|---|
| 10,166,829 B2 | 1/2019 | Hubert et al. |
| 2004/0182661 A1* | 9/2004 | Lun ..................... F16F 9/3242 188/267.2 |
| 2011/0180361 A1* | 7/2011 | De Kock ................ F16F 9/062 188/269 |
| 2015/0041268 A1 | 2/2015 | Luce |
| 2015/0090548 A1* | 4/2015 | Yamanaka ............ F16F 9/3221 29/434 |
| 2015/0159723 A1* | 6/2015 | Thein ................... F16F 9/3242 188/322.16 |
| 2015/0273968 A1* | 10/2015 | DeBruler ............... F16F 9/585 403/221 |
| 2016/0017953 A1* | 1/2016 | Lee ....................... F16F 9/365 188/297 |
| 2016/0167791 A1 | 6/2016 | Roach et al. |
| 2017/0158012 A1 | 6/2017 | Hubert et al. |
| 2018/0045318 A1* | 2/2018 | Tanida .................. F16J 15/002 |

\* cited by examiner

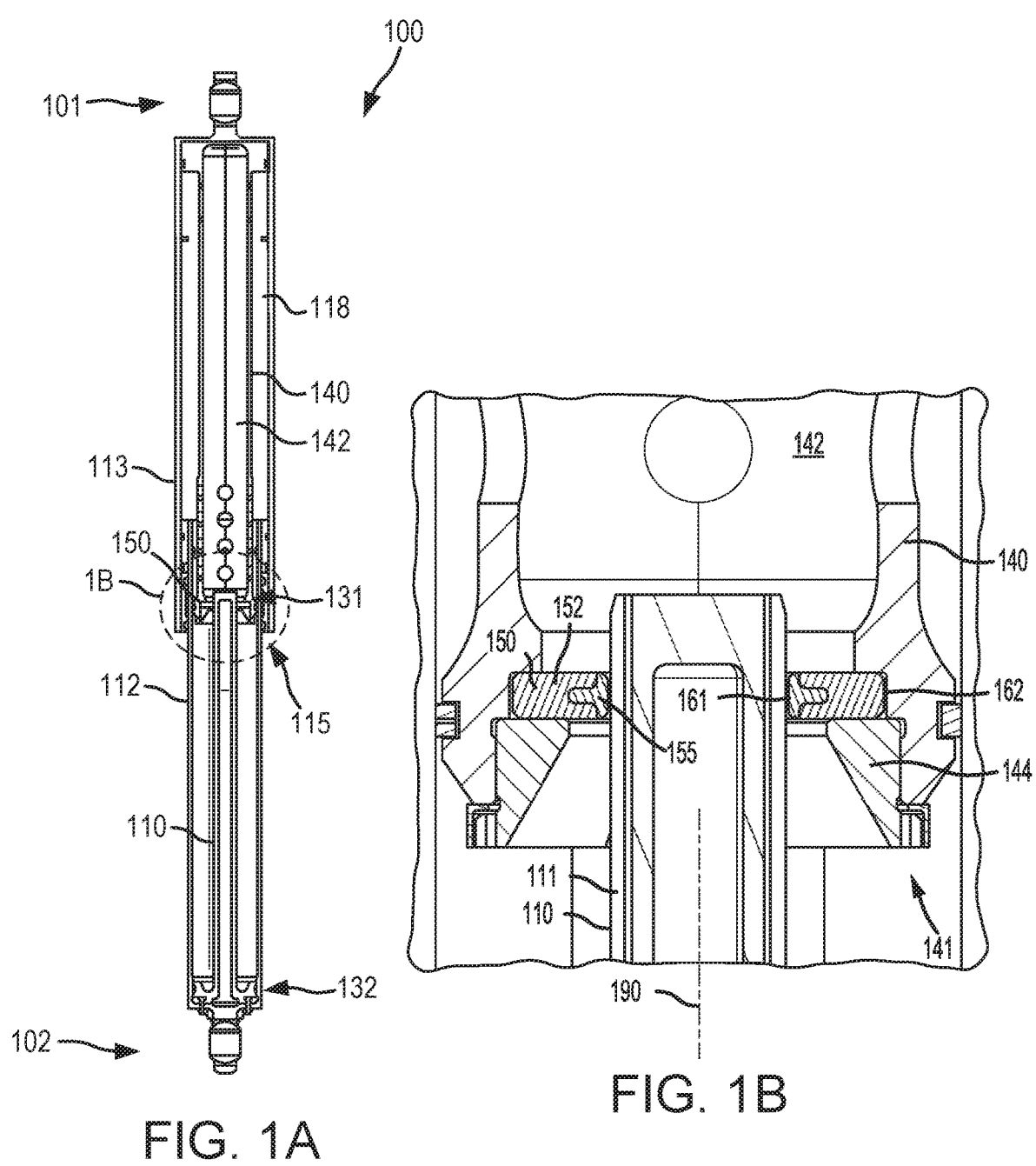

NON-METALLIC ORIFICE PLATE WITH METALLIC WEAR INSERT

FIELD

The present disclosure relates to shock strut systems, and more specifically, to orifice plates for shock struts.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. Shock struts control motion of the landing gear, and absorb and damp loads imposed on the gear during landing, taxiing, braking, and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, similar to a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

Conventional orifice plates used in landing gear shock struts are made as entirely metallic components.

SUMMARY

An orifice plate is disclosed, comprising a body portion comprised of a non-metallic material, and a metallic wear insert, wherein the metallic wear insert defines an inner diameter surface of the orifice plate and the body portion defines an outer diameter surface of the orifice plate.

In various embodiments, the body portion comprises at least one of a thermoplastic and a thermoset carbon fiber reinforced composite.

In various embodiments, the metallic wear insert comprises at least one of aluminum, nickel, and bronze.

In various embodiments, the metallic wear insert is embedded into the body portion.

In various embodiments, the metallic wear insert comprises a geometric feature for retaining the wear insert in the body portion.

In various embodiments, the body portion comprises at least one of a polyethylene (PE), a polypropylene, and a polyvinyl chloride (PVC).

In various embodiments, the inner diameter surface of the orifice plate is configured to receive a metering pin.

In various embodiments, the geometric feature extends radially outward from the orifice plate.

A shock strut is disclosed, comprising a strut cylinder, a strut piston operatively coupled to the strut cylinder, an orifice plate, and a metering pin extending through the orifice plate, wherein the orifice plate comprises a body portion comprised of a non-metallic material, and a metallic wear insert, wherein the metallic wear insert defines an inner diameter surface of the orifice plate and the body portion defines an outer diameter surface of the orifice plate.

In various embodiments, the body portion comprises at least one of a thermoplastic and a thermoset carbon fiber reinforced composite.

In various embodiments, the metallic wear insert comprises at least one of aluminum, nickel, and bronze.

In various embodiments, the metallic wear insert is embedded into the body portion.

In various embodiments, the metallic wear insert comprises a geometric feature for retaining the wear insert in the body portion.

In various embodiments, the body portion comprises at least one of a polyethylene (PE), a polypropylene, and a polyvinyl chloride (PVC).

In various embodiments, the inner diameter surface of the orifice plate is configured to receive the metering pin.

In various embodiments, the geometric feature extends radially outward from the orifice plate.

A method for manufacturing an orifice plate is disclosed, comprising forming a wear insert, and forming a body portion around the wear insert, wherein the wear insert is embedded in the body portion in response to the body portion being formed around the wear insert.

In various embodiments, the body portion is formed around the wear insert using a molding process.

In various embodiments, the body portion comprises at least one of a thermoplastic or a thermoset carbon fiber reinforced composite.

In various embodiments, the wear insert is formed from a metal and the body portion is formed around the wear insert subsequent to the wear insert being formed.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIG. 1A illustrates a schematic of a shock strut comprising a non-metallic orifice plate with an embedded metallic wear insert, in accordance with various embodiments;

FIG. 1B illustrates an enlarged view of the non-metallic orifice plate with the embedded metallic wear insert coupled to the shock strut of FIG. 1A, in accordance with various embodiments;

Figure 2A:
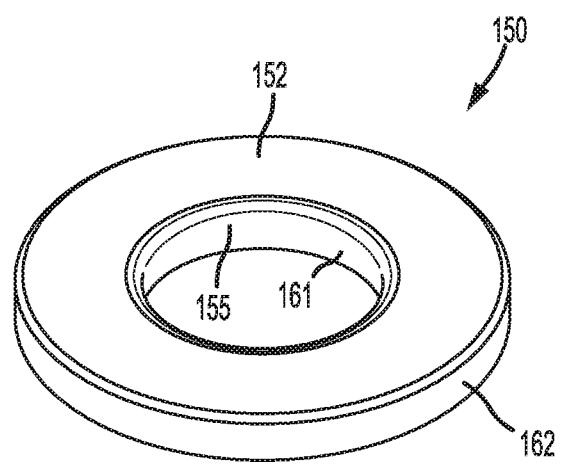
FIG. 2A illustrates a perspective view of the non-metallic orifice plate with the embedded metallic wear insert, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As disclosed herein, an orifice plate may comprise a body portion comprised of a non-metallic material, and a metallic wear insert, wherein the metallic wear insert defines an inner diameter surface of the orifice plate and the body portion defines an outer diameter surface of the orifice plate. The disclosed orifice plate may provide weight-savings, while maintaining wear resistance at the inner diameter surface, as well as ease of manufacturing.

With reference to FIG. 1A, a section view of a shock strut 100 in a fully extended position is illustrated, in accordance with various embodiments. Shock strut 100 may be configured to absorb and dampen forces transmitted between a vehicle and the ground. Shock strut 100 may comprise a strut piston 112 and a strut cylinder 113. Strut cylinder 113 may be configured to receive strut piston 112 in a manner that allows the two components to telescope together and absorb and dampen forces transmitted between a first end 101 (also referred to herein as a proximal end) and a second end 102 (also referred to herein as a distal end) of shock strut 100. In various embodiments, a fluid, such as a hydraulic fluid, and oil, and/or a gas is located within strut cylinder 113. Strut cylinder 113 and strut piston 112 may, for example, be configured to seal such that liquid contained within strut cylinder 113 is prevented from leaking as strut piston 112 translates relative to strut cylinder 113. Further, strut cylinder 113 may be configured to contain a gas such as nitrogen gas or air. Shock strut 100 may comprise a proximal end 101 and a distal end 102, wherein the distal end 102 is opposite the proximal end 101, the distal end 102 being the end of the shock strut closest to a wheel or wheel assembly of a vehicle. A gas chamber may be positioned above an oil chamber (referred to as an "air-over-oil" arrangement) or vice versa, where the term "above" in this context means in the direction of the proximal end 101 of the shock strut 100. Similarly, strut cylinder 113 and strut piston 112 may be sealed such that gas is prevented from leaking as strut piston 112 moves relative to strut cylinder 113. As such, shock strut 100 may comprise a pressurized environment within strut cylinder 113.

In various embodiments, the strut cylinder 113 may comprise a hollow circular tube having various components disposed within. Strut cylinder 113 may comprise a strut chamber 118. Strut cylinder 113 may comprise an orifice support tube 140. Orifice support tube 140 may comprise a hollow tube having a plurality of orifices through which oil or gas may travel. In this regard, orifice support tube 140 may comprise a tube channel 142 in fluid communication with strut chamber 118. In this regard strut chamber 118 may comprise tube channel 142 defined by orifice support tube 140. Various fluids may be disposed in strut chamber 118. Air may be disposed within strut chamber 118. Oil may be disposed within strut chamber 118, whether alone or in combination with a gas such as air or nitrogen gas.

In various embodiments, strut piston 112 may comprise a hollow circular tube. At least a portion of strut piston 112 may be received by open end 115 of strut cylinder 113. Strut piston 112 may comprise a metering pin 110. Metering pin 110 may move with strut piston 112 with respect to strut cylinder 113. Metering pin 110 may be received in orifice support tube 140. Strut piston 112 may be reciprocally received within the strut cylinder 113. In various embodiments, strut piston 112 may be reciprocally received within strut cylinder 113 in a concentric relationship with and between the strut cylinder 113 and orifice support tube 140.

In various embodiments, one or more bearings may be disposed between strut cylinder 113 and strut piston 112 against which the strut piston 112 slides.

In various embodiments, metering pin 110 may comprise a first end 131 (also referred to herein as a proximal end) and a second end 132 (also referred to herein as a distal end). Second end 132 may be coupled to strut piston 112. First end 131 may be received into orifice support tube 140. In various embodiments, the strut cylinder 113 may comprise an orifice plate 150. Metering pin 110 may be received by orifice plate 150. Metering pin 110 may slide against an inner diameter (ID) surface of orifice plate 150. In this regard, metering pin 110 may extend through orifice plate 150.

With reference to FIG. 1B, an enlarged view of orifice plate 150 installed in shock strut 100 is illustrated, in accordance with various embodiments. In various embodiments, orifice plate 150 may be coupled to orifice support tube 140. Orifice plate 150 may be disposed in orifice support tube 140. The outer portion (i.e., at outer diameter (OD) surface 162) of orifice plate 150 may be coupled to orifice support tube 140. A threaded fastener 144 may be coupled to the open end 141 of orifice support tube 140. Orifice plate 150 may float between threaded fastener 144 and orifice support tube 140.

Orifice plate 150 may comprise a body portion 152 comprised of a non-metallic material, such as a thermoplastic or a thermoset carbon fiber reinforced composite, for example. Orifice plate 150 may comprise an embedded metallic wear insert 155 (also referred to herein as a wear insert) embedded into the body portion 152, the wear insert 155 defining the inner diameter (ID) surface 161 of orifice plate 150. Wear insert 155 may be comprised of a metal, such as an aluminum, a nickel, and a bronze, or an alloy thereof. Wear insert 155 may provide a wear resilient surface against which metering pin 110 may slide. Body portion 152 may define a majority of the volume of orifice plate 150. For example, wear insert 155 may extend from ID surface 161 to less than midway between ID surface 161 and outer diameter (OD) surface 162 of orifice plate 150. The non-metallic material of body portion 152 may be lighter per unit volume than the metallic material of wear insert 155. In this manner, orifice plate 150 may provide weight-savings while maintaining wear resistance at ID surface 161.

In various embodiments, metering pin 110 may be hollow. In various embodiments, metering pin 110 may comprise a plurality of channels 111 extending axially along the outer surface of metering pin 110 whereby a flow of a fluid between strut piston 112 and strut cylinder 113 is metered, with momentary reference to FIG. 1A. Plurality of channels 111 may extend parallel with centerline axis 190 of metering pin 110. In this regard, a fluid may flow from within strut piston 112 to strut chamber 118, via plurality of channels 111, in response to shock strut 100 moving towards a compressed position. Inversely, the fluid may flow from within strut chamber 118 to strut piston, via plurality of channels 111, in response to shock strut 100 moving towards an extended position. The size of each channel 111 may vary along the length of metering pin 110 such that the flow of the fluid between strut chamber 118 and strut piston 112 is metered dependent upon the position of strut piston 112 with respect to strut cylinder 113. For example, the depth of each channel 111 may be greater at first end 131 and may decrease in depth along the length of metering pin 110 towards second end 132. In this manner, metering pin 110 and orifice plate 150 may work together to meter a flow of fluid traveling between metering pin 110 and orifice plate 150, through channels 111, within shock strut 100.

With reference to FIG. 2A, an isometric view of orifice plate 150 is illustrated, in accordance with various embodiments. Orifice plate 150 may comprise an annular geometry.

Figure 2B:
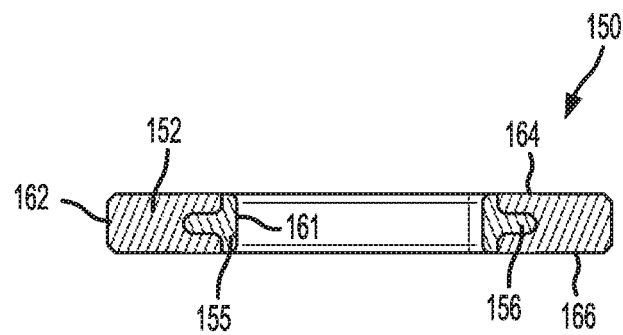
FIG. 2B illustrates a section view of the non-metallic orifice plate with the embedded metallic wear insert of FIG. 2A, in accordance with various embodiments.

With reference to FIG. 2B, a section view of orifice plate 150 is illustrated, in accordance with various embodiments. Wear insert 155 may comprise a generally smooth ID surface 161. Wear insert 155 may comprise a geometric feature 156 whereby wear insert 155 is mechanically disposed into body portion 152. Geometric feature 156 may mechanically block wear insert 155 from moving axially with respect to body portion 152. In this regard, body portion 152 may surround geometric feature 156. In various embodiments, geometric feature 156 may comprise a flange, a tab, or the like extending from wear insert 155. Geometric feature 156 may extend radially outward from wear insert 155. Geometric feature 156 may be disposed substantially midway between first side surface 164 and second side surface 166 of body portion 152. Geometric feature 156 and wear insert 155 may comprise a single, monolithic piece. Geometric feature 156 may retain wear insert 155 in body portion 152.

In various embodiments, body portion 152 is comprised of a thermoplastic material, such as polyethylene (PE), polypropylene, polyvinyl chloride (PVC), or the like. In this regard, body portion 152 may result in reduced weight of the overall shock strut 100 as compared to orifice plates comprised of a metal material or other material which is more dense than a thermoplastic material.

Orifice plate 150 may be manufactured by embedding wear insert 155 into body portion 152. Orifice plate 150 may be manufactured by forming body portion 152 around wear insert 155.

In various embodiments, orifice plate 150 is manufactured using an additive manufacturing process. As used herein, the term "additive manufacturing" encompasses any method or process whereby a three-dimensional object is produced by creation of a substrate or material to an object, such as by addition of successive layers of a material to an object to produce a manufactured product having an increased mass or bulk at the end of the additive manufacturing process than the beginning of the process. A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and digital light processing. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, are intended to be included within the scope of the present disclosure. As used herein, the term "additive manufacturing" should not be construed to encompass fabrication or joining of previously formed objects. For example, orifice plate 150 may be manufactured using an additive manufacturing process wherein wear insert 155 comprises a metallic substrate, or workpiece, whereon body portion 152 is "printed" using an additive manufacturing technique.

In various embodiments, orifice plate 150 is manufactured using a subtractive manufacturing process. As used herein, the term "subtractive manufacturing" encompasses any method or process whereby a three-dimensional object is produced by removing material, such as cutting, lathing, drilling, grinding, and/or the like, to produce a final manufactured object that has a decreased mass or bulk relative to the starting workpiece. For example, orifice plate 150 may be manufactured using a subtractive manufacturing process wherein wear insert 155 is embedded into body portion 152 and body portion 152 is subtractively manufactured to its final form.

In various embodiments, orifice plate 150 is manufactured using a molding process, such as injection molding. A molding process may utilize the steps of creating a form, making a mold of the form, and casting a material (such as a thermoplastic or a thermoset carbon fiber reinforced composite) using the mold. For example, wear insert 155 may be placed into a mold and body portion 152 may be formed around wear insert 155 during the molding process.

Figure 3:
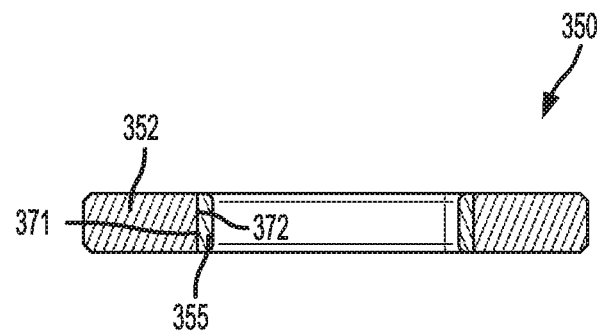
FIG. 3 illustrates a section view of a non-metallic orifice plate with a metallic wear insert, in accordance with various embodiments.

With reference to FIG. 3, an orifice plate 350 is illustrated, in accordance with various embodiments. Orifice plate 350 comprises a body portion 352 and a wear insert 355. Orifice plate 350 may be similar to orifice plate 150 of FIG. 2B, except that wear insert 355 does not include geometric feature 156, with momentary reference to FIG. 2B. An OD surface 371 of wear insert 355 may mate against an ID surface 372 of body portion 352. Wear insert 355 may be pressed into body portion 352. In this regard, wear insert 355 may be retained within body portion 352 due to friction between OD surface 371 and ID surface 372. Wear insert 355 may be adhered to body portion 352 using an adhesive, such as a resin for example, disposed between OD surface 371 and ID surface 372.

Figure 4:
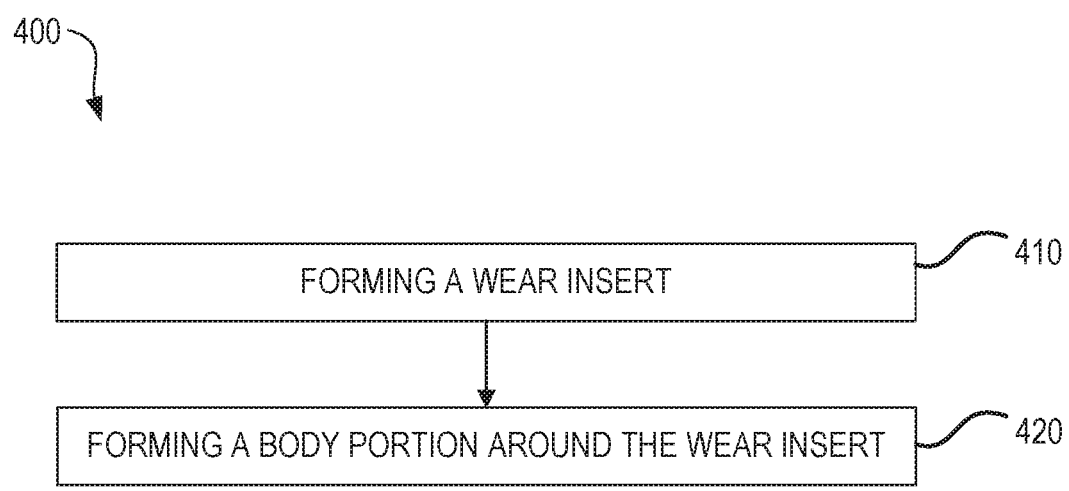
FIG. 4 illustrates a method for manufacturing a non-metallic orifice plate with an embedded metallic wear insert, in accordance with various embodiments.

With reference to FIG. 4, a flow chart providing a method 400 for manufacturing an orifice plate is illustrated, in accordance with various embodiments. Method 400 include forming a wear insert (step 410). Method 400 includes forming a body portion around the wear insert (step 420). Step 420 may be performed subsequent to step 410.

With combined reference to FIG. 2B, FIG. 3, and FIG. 4, step 410 may include forming wear insert 155. Step 410 may include forming wear insert 355. Wear insert 155 and/or wear insert 355 may be formed from a metallic material using any suitable manufacturing method, including additive manufacturing methods, subtractive manufacturing methods, forging methods, casting methods, or the like. Step 420 may include forming body portion 152 around wear insert 155. Step 420 may include forming body portion 352 around wear insert 355. Body portion 152 may be formed around wear insert 155 using additive manufacturing methods, subtractive manufacturing methods, a molding process, or any combination thereof. Body portion 352 may be formed as an annular element around wear insert 355 during the forming process. Body portion 352 may be formed as an annular element separate from wear insert 355, and subsequently disposed around wear insert 355. In various embodiments, method 400 may further include disposing an adhesive on OD surface 371 and/or ID surface 372.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An orifice plate, comprising:
    a body portion comprised of a non-metallic material, wherein the body portion comprises a first side surface, a second side surface facing opposite the first side surface, a first outer diameter surface extending from the first side surface to the second side surface, and a first inner diameter surface extending from the first side surface to the second side surface; and
    a metallic wear insert configured to receive a metering pin, wherein the metallic wear insert comprises a third side surface, a fourth side surface facing opposite the third side surface, a second outer diameter surface extending from the third side surface to the fourth side surface, and a second inner diameter surface extending from the third side surface to the fourth side surface;
    wherein the second outer diameter surface of the metallic wear insert mates against the first inner diameter surface of the body portion, and
    the first side surface is substantially flush with the third side surface, and
    the second side surface is substantially flush with the fourth side surface.

2. The orifice plate of claim 1, wherein the body portion comprises at least one of a thermoplastic and a thermoset carbon fiber reinforced composite.

3. The orifice plate of claim 2, wherein the metallic wear insert comprises at least one of aluminum, nickel, and bronze.

4. The orifice plate of claim 1, wherein the metallic wear insert is embedded into the body portion.

5. The orifice plate of claim 4, wherein the metallic wear insert further comprises a geometric feature for retaining the wear insert in the body portion, wherein the geometric feature extends radially outward from the metallic wear insert substantially midway between the third side surface and the fourth side surface.

6. The orifice plate of claim 2, wherein the body portion comprises at least one of a polyethylene (PE), a polypropylene, and a polyvinyl chloride (PVC).

7. A shock strut, comprising:
    a strut cylinder;
    a strut piston operatively coupled to the strut cylinder;
    an orifice plate; and
    a metering pin extending through the orifice plate,
    wherein the orifice plate comprises a body portion comprised of a non-metallic material, and a metallic wear insert, wherein the metallic wear insert defines an inner diameter surface of the orifice plate and the body portion defines an outer diameter surface of the orifice plate; and a first side surface of the body portion is substantially flush with a first side surface of the metallic wear insert, and the first side surface of the body portion is an axially outermost surface of the orifice plate.

8. The shock strut of claim 7, wherein the body portion comprises at least one of a thermoplastic and a thermoset carbon fiber reinforced composite.

9. The shock strut of claim 8, wherein the metallic wear insert comprises at least one of aluminum, nickel, and bronze.

10. The shock strut of claim 7, wherein the metallic wear insert is embedded into the body portion.

11. The shock strut of claim 10, wherein the metallic wear insert comprises a geometric feature for retaining the wear insert in the body portion.

12. The shock strut of claim 8, wherein the body portion comprises at least one of a polyethylene (PE), a polypropylene, and a polyvinyl chloride (PVC).

13. A method for manufacturing an orifice plate, comprising:
    forming a wear insert; and
    forming a body portion around the wear insert using a molding process, wherein the wear insert is in contact with, and embedded in, the body portion in response to the body portion being formed around the wear insert during the molding process.

14. The method of claim 13, wherein the body portion comprises at least one of a thermoplastic or a thermoset carbon fiber reinforced composite.

15. The method of claim 13, wherein the wear insert is formed from a metal and the body portion is formed around the wear insert subsequent to the wear insert being formed.

16. The orifice plate of claim 1, wherein the metallic wear insert extends from the second inner diameter surface to less than midway between the second inner diameter surface and the first outer diameter surface.

17. The orifice plate of claim 1, wherein the metallic wear insert is adhered to the body portion using an adhesive.

18. The orifice plate of claim 4, wherein the body portion is formed around the metallic wear insert using a molding process.

* * * * *